US010640411B2

(12) United States Patent
Betschart et al.

(10) Patent No.: US 10,640,411 B2
(45) Date of Patent: May 5, 2020

(54) DEVICE FOR BENDING SHEETS OF GLASS

(71) Applicant: SAINT-GOBAIN GLASS FRANCE, Courbevoie (FR)

(72) Inventors: Olivier Betschart, Senlis (FR); Robert Lagneaux, Attichy (FR); Guénaël Bouillé, Longueil Annel (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 136 days.

(21) Appl. No.: 15/563,005

(22) PCT Filed: Mar. 30, 2016

(86) PCT No.: PCT/FR2016/050711
§ 371 (c)(1),
(2) Date: Sep. 29, 2017

(87) PCT Pub. No.: WO2016/156735
PCT Pub. Date: Oct. 6, 2016

(65) Prior Publication Data
US 2018/0362386 A1 Dec. 20, 2018

(30) Foreign Application Priority Data

Apr. 3, 2015 (FR) ..................................... 15 52932

(51) Int. Cl.
*C03B 23/035* (2006.01)
*C03B 35/20* (2006.01)
(Continued)

(52) U.S. Cl.
CPC ...... *C03B 23/0357* (2013.01); *C03B 23/0254* (2013.01); *C03B 23/03* (2013.01);
(Continued)

(58) Field of Classification Search
CPC . C03B 23/0254; C03B 23/03; C03B 23/0355; C03B 23/0357; C03B 35/16; C03B 35/202; C03B 2225/02
See application file for complete search history.

(56) References Cited

U.S. PATENT DOCUMENTS 4,778,507 A * 10/1988 Aruga ................. C03B 23/0252
65/106
4,830,650 A 5/1989 Kelly
(Continued)

FOREIGN PATENT DOCUMENTS

CN 102173568 A 9/2011
EP 2 412 682 A1 2/2012
(Continued)

OTHER PUBLICATIONS

International Search Report as issued in International Patent Application No. PCT/FR2016/050711, dated Jul. 14, 2016.
(Continued)

*Primary Examiner* — Lisa L Herring
(74) *Attorney, Agent, or Firm* — Pillsbury Winthrop Shaw Pittman LLP (57) ABSTRACT

A device for bending sheets of glass, includes conveying rollers that convey the sheets one after another in a longitudinal direction, carrying them under an upper bending die and onto a receiving surface formed by the upper level of the rollers under the die. The device includes an intermediate support including a contact path for supporting the sheet of glass to be pressed lying under the die. The contact path has, parallel to the edge of the sheet to be pressed, a curvature that is less accentuated than the curvature that is to be imparted by the upper die. The intermediate support can rise above the receiving surface and support the sheet to be pressed until the sheet breaks contact with the rollers. The intermediate support can be lowered down below the receiv-
(Continued)

ing surface. A sheet-pressing system can press the periphery of the sheet against the upper bending die.

33 Claims, 4 Drawing Sheets

(51) Int. Cl.
    *C03B 23/025*     (2006.01)
    *C03B 23/03*     (2006.01)
    *C03B 35/16*     (2006.01)

(52) U.S. Cl.
    CPC ...... *C03B 23/0352* (2013.01); *C03B 23/0355* (2013.01); *C03B 35/16* (2013.01); *C03B 35/202* (2013.01); *C03B 2225/02* (2013.01)

(56) References Cited

U.S. PATENT DOCUMENTS

| | | |
|---|---|---|
| 5,401,286 A | 3/1995 | Goolsbay et al. |
| 2004/0129028 A1 | 7/2004 | Balduin et al. |

FOREIGN PATENT DOCUMENTS

| | | |
|---|---|---|
| GB | 2265898 A | 10/1993 |
| JP | H01-024050 A | 1/1989 |
| JP | H04-219334 A | 8/1992 |
| JP | H10-152333 A | 6/1998 |
| JP | 2000-327350 A | 11/2000 |
| JP | 2002-029765 A | 1/2002 |
| WO | WO 02/06170 A1 | 1/2002 |
| WO | WO 2011/144865 A1 | 11/2011 |
| WO | WO 2014/053776 A1 | 4/2014 |
| WO | WO-2016030678 A1 * 3/2016 ....... B32B 17/10036 |

OTHER PUBLICATIONS

Office Action as issued in Indian Patent Application No. 201717033695, dated Mar. 9, 2020.

* cited by examiner

DEVICE FOR BENDING SHEETS OF GLASS

CROSS-REFERENCE TO RELATED APPLICATIONS

This application is the U.S. National Stage of PCT/FR2016/050711, filed Mar. 30, 2016, which in turn claims priority to French patent application number 1552932 filed Apr. 3, 2015. The content of these applications are incorporated herein by reference in their entireties.

The invention relates to a method and a device in the field of the bending of sheets of glass by pressing them against an upper bending die.

WO0206170 teaches how to bend sheets of glass against a convex full-surface upper bending die. The sheets are brought one after another by a bed of conveying rollers under a convex full-surface upper bending die and a press ring rises to pick up a sheet and press it against the upper die. The press ring has a shape that complements that of the full-surface bending die, this shape corresponding to the shape ultimately desired for the sheet. Bearing in mind the fact that the sheet arrives under the convex die flat and that the ring has the final bent shape, the ring raises the sheet touching it only at certain points on the periphery, which may even be restricted to three peripheral points. Bearing in mind the flexibility and the formability of the sheet, given that it is at its bending temperature, the sheet is initially raised only at these points of contact and its central region continues for a certain length of time to be in contact with the rollers lying under the bending die. It is not until the press ring reaches a certain height that the central region of the sheet finally breaks contact with the rollers. This longer period of contact with the rollers at the center of the sheet of glass may cause marks or optical defects which are all the more penalizing given that they are situated in the central region of the glass.

The invention overcomes the abovementioned problem. According to the invention, when the sheet of glass is in position under the upper bending die it is first of all raised very quickly by a support referred to as an "intermediate support" which has less curvatures than the final curvatures desired and that are given by the upper die, said intermediate support if appropriate having no curvature, this being so as to shorten as much as possible the time that the sheet spends in contact with the conveying rollers. The glass is then pressed against the upper bending die by a pressing means, which acts with a pneumatic force or a mechanical force.

The means that presses the sheet against the upper die is a means distinct from the intermediate support. This pressing means may be pneumatic in nature, such as blowing coming from underneath and blowing between the rollers onto the underside of the sheet, or suction from above the sheet. Suction applied to the upper face of the sheet may be applied through orifices formed in the bending face of the upper bending die. Suction may also be applied through a skirt surrounding the upper bending die. WO2011/144865 shows, in FIG. 3 thereof, an upper bending die equipped both with orifices in its bending face for applying suction to the upper face of the sheet and with a skirt 39 surrounding the upper bending die so as to cause an upward stream of air that sweeps over the edge of the sheet. A pneumatic force always takes a certain amount of time to become established. This is why when a pneumatic force is chosen as means of pressing against the upper die, it is beneficial for the sheet that is to be pressed to be raised as quickly as possible by the intermediate support according to the invention, in particular an intermediate ring, in order to cause it to relinquish all contact with the rollers and give the pneumatic force time to attain its optimal force.

The means of pressing the sheet against the upper die may be mechanical in nature and in that case comprises a bending ring having curvatures corresponding to those desired for the final shape of the sheet of glass and therefore also curvatures that complement the upper bending die. The bending ring is preferably rigid enough that it does not deform during pressing or at any moment during the method according to the invention.

The device according to the invention generally comprises a bending ring comprising a contact path for supporting the sheet that is to be pressed, said contact path having, with respect to the sheet that is to be pressed, a curvature that is more accentuated than the curvatures of the intermediate support, said intermediate support and said bending ring being able to move vertically one inside the other, said bending ring being able to rise and pick up the periphery of the sheet, relieving the intermediate support of the weight of the sheet at least partially, if not completely. In general, the intermediate support is on the inside of the bending ring when viewed from above. The bending ring may rise and support the periphery of the sheet, thereby relieving the intermediate support of the weight of the sheet at least partially, if not completely, and may if appropriate press said sheet against the upper bending die. In a direction parallel to the edge of the sheet that is to be pressed, the bending ring has a curvature that is more accentuated than the curvatures of the intermediate support. Of course, the direction is "parallel" when viewed from above, and the curvatures are evaluated when viewed from the side, it being appreciated that the "direction" varies along the edge of the sheet.

The intermediate support and the bending ring support the glass in juxtaposed zones. If a region of the supported glass is considered (for example the middle of one side of the sheet of glass), said region covering the zone that comes into contact with the intermediate support and the zone that comes into contact with the bending ring, then for this region and in a direction parallel (when viewed from above) to the edge of the sheet that is to be pressed, the curvature of the contact path of the bending ring is greater than the curvature of the contact path of the intermediate support with respect to the sheet that is to be pressed. This condition regarding the relative curvature of the intermediate support and of the bending ring is valid only for the sides of the sheet of glass that come into contact both with the intermediate support and with the bending ring. Specifically, the intermediate support does not necessarily come into continuous contact underneath the entire perimeter of the sheet of glass and may, for example, be made up of two segments coming under just two edges of the sheet of glass, preferably the two longest edges.

The intermediate support is rigid and preferably does not deform under the weight of the glass. The same is true of the bending ring.

The bending ring may be used to perform sag bending on the sheet that is to be pressed before it is pressed against the upper die. In that case, the bending ring is not necessarily used to press the sheet of glass that is to be pressed against the upper die. After sag bending on the bending ring, bending may be continued by pressing against the upper die using a pneumatic pressing means of the suction or blowing type that holds the sheet that is to be pressed firmly against the upper bending die. In that case, the bending ring has curvatures somewhere between those of the intermediate support and those given by the upper bending die, or curvatures that complement the curvature of the upper bending die.

The bending ring may act as a press ring for pressing against the upper bending die. In that case, the bending ring has a shape that complements the upper bending die. The bending ring supporting the sheet that is to be pressed and the upper bending die are given a relative movement of one toward the other until they are pressing the sheet that is to be pressed between them in order to impart to it its final shape. For this relative movement, the bending ring rises toward the upper die and the upper die remains fixed or is lowered toward the bending ring. The pressure applied by a bending ring may be assisted using a pneumatic force that supplements the mechanical force applied by the bending ring. In particular, it may be beneficial for suction to be applied by the contact face of the upper bending die via orifices in this face, while the periphery is being pressed by the bending ring. Indeed, thanks to this suction, any air that might be trapped between the sheet of glass and the upper bending die is eliminated. The sheet is thus able more faithfully to adopt the shape of the upper bending die. Thus, after the intermediate support has supported the sheet that is to be pressed, the bending ring presses the periphery of the sheet that is to be pressed against the upper bending die. This pressing is applied via a moving-together movement between the bending ring and the upper bending die. In general, for this pressing, the bending ring rises higher than the intermediate support.

The bending ring may be used initially as a sag bending ring and then be used as a press ring for pressing the sheet that is to be pressed against the upper die.

The intermediate support and the bending ring (whether this is a sag-bending ring and/or a press ring for pressing against the upper die) move one inside the other while at the same time always remaining substantially horizontal. Their movement is chiefly a vertical movement. One of these two elements has a smaller perimeter than the other so that it can pass through it. In general, the external contour of one of these two elements more or less corresponds to the internal contour of the other ring. The intermediate support and the bending ring do not therefore support the glass at exactly the same point, but at points that are juxtaposed. The bending ring supports the periphery of the sheet of glass that is to be pressed, it being understood that the term "periphery" (also referred to as "peripheral zone") corresponds to a zone at the border of a main face of the sheet between the edge of the glass and up to 15 cm and more generally up to 7 cm and more generally still, up to 3 cm from the edge of the glass. In general, the bending ring, if used as a press ring, overhangs the glass, which means to say that the far edge of the glass rests on the inside of the contact path of the bending ring. In general, the intermediate support likewise supports the glass at its periphery and generally only at its periphery, with no contact with the glass in a central zone of the glass, which means to say beyond the periphery measured from the edge of the glass. In general, it is the intermediate support that passes inside the bending ring. The bending ring therefore supports the glass further toward the outside than the intermediate support.

According to the invention, several intermediate rings may be involved in supporting the sheet of glass prior to the press bending. These intermediate rings are juxtaposed one next to the other when viewed from above and are generally contained inside one another when viewed from above, without necessarily being concentric.

The intermediate support raises the sheet of glass that is to be pressed as quickly as possible when this sheet is in position under the upper bending die. Because the intermediate support has small curvatures, or is even flat, it tends to raise the sheet also keeping it curved the least possible amount, or even keeping it substantially flat, and it is this that allows the sheet very quickly to break any contact with the rollers. The same would not be true with a bending ring because that has more pronounced curvatures than the intermediate support, or even has the curvatures desired for the final sheet. Indeed, a bending ring comes into contact with the sheet of glass first of all at the highest points (which are generally the corners), and then needs a longer upward travel in order for the sheet no longer to touch the rollers. A bending ring therefore has in particular to start from further below the upper level of the rollers for the sheet to be able to travel freely on the rollers and position itself in an appropriate position under the upper die, and has also to perform a greater upward travel. These two requirements combined result, according to the prior art, in the absence of an intermediate support, in a longer period of time for which the sheet remains in contact with the rollers. In the context of the present application, the "receiving surface" is the term given to the virtual surface consisting of the upper level of the rollers situated under the upper bending die, also referred to as the "final rollers". If the rollers are cylindrical (their axis being linear), this receiving surface is flat. If the receiving surface is flat, the sheets arrive flat on the receiving surface which means that the underside of the sheet that is to be pressed is exactly in the receiving surface because this underside of the sheet is resting on the upper level of the final rollers. The conveying rollers are juxtaposed in a bed and via their upper level form a surface for progressing the sheets one by one. This bed and this progressing surface are generally flat as far as the receiving surface under the upper bending die and including this receiving surface. The conveying rollers may, however, also impart a slight curvature to the sheets so as to perform some preliminary sag bending on the path leading them to the receiving surface. Rollers of this type, referred to as "shaped rollers" are in particular described in WO2014053776. In this case, the sheet that is to be pressed arrives at the receiving surface under the upper bending die slightly curved. In this case, for preference, the intermediate support, in particular of the ring type, has curvatures corresponding to those of the sheet that has arrived at the receiving surface.

The intermediate support is substantially horizontal and at its surface facing upward comprises a contact path for supporting the sheet that is to be pressed. If the sheet that is to be pressed arrives on the receiving surface flat, the glass-contact path of the intermediate support is advantageously flat and in a horizontal plane. It may also exhibit slight curvatures. These curvatures are, in a direction parallel to the edge of the sheet, less pronounced than the curvatures desired for the final bent glass at the same point. These curvatures are therefore, in a direction parallel to the edge of the sheet, also less pronounced than the curvatures of the upper bending die at the same point and with respect to the other face of the sheet of glass, it being understood that the curvatures of the contact path of the intermediate support and those of the upper bending die are the reverse of one another. The shape of the contact path of the intermediate support is therefore potentially a rough form of the final shape of the sheet of glass, which means to say a shape somewhere between, on the one hand, that of the sheet that has arrived at the receiving surface and, on the other hand, the shape that is to be imparted by the upper bending die.

Advantageously, the shape of the contact path of the intermediate support is a shape that complements that of the underside of the sheet that is to be pressed that has arrived at the receiving surface, which usually corresponds to the shape of the receiving surface. In that way, as soon as the intermediate ring touches the underside of the sheet that is to be pressed, it is the entirety of the contact path of the intermediate support that touches the underside of the sheet that is to be pressed at the same time. The weight of the sheet that is to be pressed is thus immediately distributed over the entire periphery of the contact path of the intermediate ring, thereby reducing the risk of marking.

The bending ring is substantially horizontal and at its surface facing upward comprises a path for supporting the sheet of glass, also referred to as a contact path. The glass-contact path of the bending ring has, in a direction parallel to the edge of the sheet, a curvature that is more pronounced than the curvatures of the intermediate support. The glass-contact path of the bending ring, if used as a press ring, has a shape that complements that of the upper bending die, which means to say the same shape as in its zones of contact with the glass while at the same time being the inverse of that of the upper bending die. In general, the contact path of the bending ring has concave curvatures whereas the contact face of the upper bending die is generally convex. The bending ring supports the underside of the sheet of glass and potentially presses it against the upper bending die. In general, the bending ring takes over from the intermediate support by picking up the sheet of glass to perform the sag bending thereof and/or to press it against the upper die, the intermediate support then generally no longer being in contact with the sheet of glass. However, it is not excluded for the intermediate support to remain in contact with the sheet of glass during sag bending and/or pressing by the bending ring. That may be desirable in order to support the glass at a point other than the bending ring, in particular if the bending ring is used for pressing and if the upper bending die is of the peripheral ring type. It may therefore be said that the bending ring relieves the intermediate support of at least part if not all of the weight of the sheet generally before pressing this sheet against the upper bending die.

Thus, the device according to the invention may comprise a bending ring that can press the sheet that is to be pressed against the upper bending die, said intermediate support and said bending ring being able to move vertically one inside the other, said bending ring being able to rise and come into contact with the periphery of the sheet that is to be pressed. In that case, for preference, when viewed from above, the intermediate support is on the inside of the bending ring. For preference also, the bending ring can rise above the receiving surface in order to pick up the sheet that is to be pressed, contacting it exclusively at its periphery, and can be lowered down below the receiving surface so as to allow a new sheet that is to be pressed to pass as far as the receiving surface. The bending ring lies below the receiving surface before it rises to pick up the sheet that is to be pressed that is already being supported by the intermediate support, and returns back to below the receiving surface after pressing. In that way, the intermediate support and the bending ring may both come into contact with the glass exclusively in a peripheral zone, one after the other and, if appropriate, in part simultaneously. This procedure may be performed very rapidly because these two tools, which come from underneath the receiving surface, have very little distance to cover before coming into contact with the glass and have very little distance to cover in order to come back under the receiving surface. If appropriate, the upper bending die may also be given a vertical movement in order to accelerate the process further. Specifically, the pressing may be performed by the vertical movement both of the bending ring and of the upper bending die.

The upward movement of the intermediate support and of the bending ring may be alternated or at least partially simultaneous. In the case of alternating upward movement, the intermediate support is first to rise and picks up the sheet of glass until it breaks contact with the rollers, then the bending ring rises and picks up the sheet of glass in order to press it against the upper bending die. The upward movement of the intermediate support and of the bending ring may be at least partially simultaneous if, at the beginning of said movement, the contact path of the bending ring is low enough down to allow the intermediate support to come immediately into contact with the sheet that is to be pressed as soon as it moves above the receiving surface. In that way, the intermediate support as it moves upward generally takes up most (more than 50% of the weight of the sheet) or all of the sheet of glass, said movement taking place until the sheet breaks contact with the rollers, then the intermediate support stops or slows its upward rise while the bending ring continues to rise and generally takes up most (more than 50% of the weight of the sheet) if not all of the load of the sheet of glass. At this stage, any sag bending required may take place on the bending ring. Next, pressure is applied, a pneumatic or mechanical force being applied to the sheet in order to press it against the upper die. In particular, the bending ring may press the sheet against the upper bending die. An upward movement of the intermediate support and of the bending ring at least partially at the same time allows a saving of time. Thus, it is not excluded for the bending ring already to be touching the periphery of the sheet that is to be pressed when said sheet is picked up by the intermediate support. The bending ring may then rise up higher than the intermediate support in order to press the sheet against the upper die, it being possible also for the intermediate support to maintain contact with the sheet at the time of pressing. It may be seen that the intermediate support and the bending ring may therefore maintain simultaneous contact with the sheet that is to be pressed throughout its rise toward the upper bending die, this simultaneous action affording a saving of time in the process.

The upper bending die may potentially be capable of moving vertically. Thus, in order to press the sheet, the upper die may move downward, then the pressing means presses the sheet against the upper bending die. Thereafter, the upper die may potentially rise, while at the same time holding the bent sheet against it using a pneumatic force that can be qualified as "upward", the term "upward" being used because the pneumatic force pulls or pushes the sheet of glass upward against the upper die, said upper die leaving space for a cooling ring that is positioned below it. The upward pneumatic force is then halted and the bent sheet is collected by the cooling ring underneath it, which then takes the bent sheet to a cooling zone. To do that, a downward pneumatic force (which means to say a blowing) may potentially be applied by the upper die through its bending face if this face comprises at least one orifice, in order to accelerate the detachment of the sheet from the upper bending die.

The movement (also referred to as "the activation") of the intermediate support may in particular be triggered
 on the basis of the movement of the rollers, or
 on the basis of the movement of the bending ring, or
 on the basis of the movement of the upper bending die.

The invention relates to a device according to the independent device claim and to a method according to the independent method claim.

The invention relates to a device for bending sheets of glass comprising conveying rollers that convey the sheets of glass one after another in a longitudinal direction carrying them one after another under an upper bending die and onto a receiving surface formed by the upper level of the rollers under the upper bending die, the said device comprising an intermediate support comprising a contact path for supporting the sheet lying under the upper bending die, referred to as the "sheet that is to be pressed", said contact path having, parallel to the edge of the sheet that is to be pressed, a curvature that is less accentuated than the curvature that is to be imparted by the upper die, said intermediate support being able to rise above the receiving surface and support the sheet that is to be pressed until the sheet breaks contact with the rollers, said intermediate support being able to be lowered down below the receiving surface, a sheet-pressing means of being able to press the periphery of the sheet against the upper bending die.

When the pressing means comprises a bending ring, the upper bending die and the bending ring may move one toward the other so as to press the sheet between them. The moving-together of the upper bending die and of the bending ring may be performed by lowering the upper die or by raising the bending ring or both.

The invention also relates to a method for bending sheets of glass using the device according to the invention. According to this method, the sheet of glass that is to be pressed under the upper bending die is picked up by the intermediate support which rises until the sheet breaks contact with the rollers, then the pressing means presses the sheet against the upper bending die.

According to the invention, as it rises, the intermediate support causes the glass to break contact with the rollers. This action occurs as quickly as possible when the sheet that is to be pressed is in position under the upper bending die. It is the small degree of concavity or even the flatness of the contact path of the intermediate support that allows it to raise the sheet that is to be pressed very quickly above the receiving surface for the sheet that is to be pressed. Specifically, the shape of the intermediate support advantageously corresponds to the shape of the receiving surface for the sheet that is to be pressed under the bending die. Thus, the small curvatures or even the flatness of the intermediate support, in particular of the ring type, allows it to lie just below the receiving surface for the sheet that is to be pressed, such that a very short upward movement is enough to raise the sheet and cause it to break contact with the rollers. This travel will have to be longer (in terms of distance and in terms of time) with a bending ring, because, on account of the greater curvatures of its contact path, the bending ring needs to start off from far lower down below the receiving surface for the sheet that is to be pressed. Thus, whatever the pressing means used, the intermediate support very quickly picks up the sheet resulting in an immediate loss of contact thereof with the rollers.

All of the tools that come into contact with the glass (intermediate support, bending ring, upper bending die, cooling ring) are generally covered with a refractory textile that softens the contact with the glass. These bending tools may be situated inside a furnace (namely a heated space), that keeps the glass at its deformation temperature, generally of between 550 and 1000° C. When shaping a sheet of soda-lime glass, the temperature is generally comprised in the range from 550 to 700° C. When shaping a sheet of vitreous ceramic precursor glass, the temperature is generally comprised in the range from 700 to 1000° C. However, in general, these bending tools are not situated inside a furnace, but just after a furnace that has heated the sheets to their thermal-bending temperature. Thus, in general, the bed of conveying rollers passes through a furnace in order to raise the sheets to their deformation temperature, exits the furnace and carries the sheets of glass under the upper bending die situated outside the furnace, just after the furnace exit.

The sheets of glass often bear a layer of enamel, in particular at their periphery. Advantageously, the intermediate support comes into contact with the sheet that is to be pressed in a zone that is rendered opaque by enamel, referred to as the opacified zone. It is advantageous for the intermediate support and the bending ring both to support the glass in the opacified zone or in a zone ultimately covered by a seal in final use, because then any potential marking resulting from these contacts is hidden. However, it is not excluded for the intermediate support to support the sheet that is to be pressed in a non-opacified zone (which means to say in a clear zone) and even further in than 15 cm from the edge of the glass, but it is generally preferable to avoid this. This is especially true for large sheets of glass, in particular with a main face surface area in excess of 1 m². Indeed, such supporting of the glass away from the edge by the intermediate support reduces the tendency of the glass to sag under the effect of its own weight and of the temperature, this tendency being greater in the middle of the sheet the larger the sheet is.

The contact path of the intermediate support and that of the bending ring may have a width of between 5 and 20 mm. Use is made of a wider contact path, with a width of between 10 and 20 mm, for the intermediate support if this support comes into contact with a clear zone (a zone that is not hidden in final use) of the glazing. A greater width of path coming into contact with the glass reduces the pressure of the glass on the path and, therefore, the tendency to mark the glass. This contact path generally comes into contact with the glass exclusively in a peripheral zone.

The bed of rollers conveys the sheets of glass individually one after another into a position under the upper bending die. Rollers of said bed, generally 2 or 3 or 4 rollers, or even more, thus lie under the upper bending die. These rollers are the last rollers in the bed of rollers to receive the sheets of glass before bending against the upper die and for this reason may be referred to as "final rollers". These final rollers do not impede the vertical movement of the intermediate support and of the bending ring on each side of the receiving surface for the sheets to be pressed under the upper bending die. The use of the term "final" does not mean that the bed of rollers does not continue in the longitudinal direction, because after pressing against the bending die, it is not excluded for the sheet to fall back onto the bed of rollers in order to continue its travel in the longitudinal direction.

In particular, these final rollers under the upper bending die may be less long than the other rollers of the bed and, when viewed from above, may lie inside the intermediate support and the bending ring. Thus, the intermediate support and the bending ring may pass above or below the receiving surface for the sheet of glass which surface is formed by the top of these final rollers. The final rollers may also extend beyond the intermediate support when viewed from above. In that case, the intermediate support may have a contact path that is discontinuous with respect to the underside of the sheet of glass, the contact path of the intermediate support then being made up in part of segments passing between the rollers during the vertical movement of the intermediate support. These segments may be cutouts formed in sides of the intermediate support like on the press ring referenced 21 in FIG. 3 of WO02/06170. Thus, the intermediate support may have a contact path that is continuous or discontinuous with respect to the underside of the glass. The intermediate support may even support only two sides of the sheet of glass, in which case it may be made up of two segments. In general, the segments support the longest sides of the sheet of glass. The bending ring may also be discontinuous, and for the same reasons. The bending ring preferably comes into contact with the sheet of glass along all sides, while offering contact that may potentially be discontinuous.

The intermediate support is generally a ring or is made up of segments and its glass-contact path is continuous or discontinuous, said intermediate support generally coming into contact with the glass only at its periphery, namely up to 15cm away from the edge of the glass and preferably up to 7 cm away and more preferably still, up to 3 cm away from the edge of the glass, without contacting the glass more than 15 cm away from the edge of the glass and, more generally, more than 7 cm and, more generally still, more than 3 cm away from the edge of the glass.

The bed of rollers is driven because it causes the sheets of glass to progress as far as under the upper bending die. The final rollers are also driven. The final rollers slow down and stop when the sheet that is to be pressed is in position under the upper bending die. The goal is for the sheet that is to be pressed to be in the optimal position under the upper bending die, namely for it to be in the exact position when viewed from above under the upper bending die so that it need merely be raised in order to press it. The sheet that is to be pressed may in particular find its optimal position under the upper bending die by coming into abutment via its edge face against at least one position stop and generally at least two position stops. Thus, at least one position stop may halt the travel of the sheet that is to be pressed in the longitudinal direction. The use of stops is not indispensible, it being possible for satisfactory positioning of the sheet potentially to be obtained by sufficient control over the movement of the conveying rollers and, if appropriate, of telemetry determining the position of the sheet of glass that is to be pressed.

When the glass has come into contact with at least one position stop, the final rollers are halted in terms of driven rollers. In order to prevent the glass from being marked by these final rollers continuing to turn when the glass has been halted by at least one stop, attempts are made to make the moment at which the glass touches the position stop(s) coincide as closely as possible with the moment that the motor driving the rotation of the final rollers is stopped. However, getting these two events to coincide exactly is difficult, if not impossible, and this is why it is advantageous for the intermediate support to raise the sheet of glass as quickly as possible as soon as it touches the position stop(s). In that way, continued rotation of the final rollers does not matter because these rollers are no longer in contact with the glass. Let it be noted that the aim is to limit as far as possible the time for which the glass is in contact with stationary rollers also, because the resulting localized exchanges of heat give rise to visible optical defects in transmission in the glass.

According to one option, the intermediate support rises and picks up the sheet of glass when it has not touched any position stop and, if appropriate, when the rollers have not yet completely stopped. If the rollers have not completely stopped, they have been slowed down at the moment of this picking-up of the sheet that is to be pressed by the intermediate support. After this pickup that eliminates contact between the final rollers and the sheet of glass, the intermediate support supporting the sheet moves at least in the longitudinal direction in order to bring the sheet into its optimal position, if appropriate by causing the glass to touch at least one longitudinal position stop and generally two position stops. Thus, the intermediate support can rise above the receiving surface and support the sheet that is to be pressed until the sheet breaks contact with the rollers, then effect a travel in the longitudinal direction in order to place the sheet that is to be pressed in the optimal position under the upper bending die. The intermediate support in this instance in some way replaces the final rollers for the last few millimeters of travel of the sheet that is to be pressed in the longitudinal direction. After the glass comes into contact with at least one stop, there will inevitably be a very small slippage of the sheet of glass on the intermediate support. However, it has been found that this slippage leaves less of a mark on the glass than slippage on the final rollers. In addition, the zone of contact of the intermediate support with the sheet of glass that is to be pressed (the collection of points of the sheet of glass that is to be pressed that come into contact with the intermediate support) is generally situated entirely at the periphery of said sheet (therefore no contact with the glass beyond the periphery heading toward the center of the glass), said periphery generally being hidden in final use by a seal or by opaque enamel. In that way, even if the contact between the glass and at least one stop causes a very small slippage of the glass on the intermediate support, any potential marking resulting from this is far more acceptable than slippage of the glass on the rollers. The movement of the intermediate support in the longitudinal direction may be accompanied by the same longitudinal movement of the bending ring. Specifically, at this stage in the method, the intermediate support and the bending ring are very close together and lie one inside the other when viewed from above. However, there may be enough clearance between these two rings for the longitudinal movement of the intermediate support, which incidentally is small in amplitude, not to involve an equivalent movement of the bending ring.

In particular, the exact positioning of the sheet of glass may be ensured in the longitudinal direction and in the lateral direction (which means to say in X-Y) by using at least two position stops. In particular, there may be one or two stops rather devoted to halting the travel of the sheet of glass that is to be pressed in the longitudinal direction, and one stop rather devoted to halting the travel of the sheet in the lateral direction. The choice of the number of stops and of the position thereof is dependent on the geometry of the glazing.

According to one embodiment, use may be made of at least two stops, one halting the travel of the sheet that is to be pressed in the longitudinal direction, and the other halting the travel of the sheet that is to be pressed in the lateral direction. In this case, just before the sheet of glass touches at least one stop that halts its longitudinal travel, the intermediate support rises and picks up the sheet of glass. After this pickup that eliminates contact between the final rollers and the sheet of glass, the intermediate support supporting the sheet moves both, on the one hand, in the longitudinal direction in order to cause at least one stop that halts its longitudinal travel to touch the glass and, on the other hand, in the lateral direction in order to cause at least one stop that halts its travel in the lateral direction to touch the glass. The movement of the intermediate support therefore has a longitudinal component and a lateral component. Here again, the combined movement in the longitudinal direction and in the lateral direction of the intermediate support may be accompanied by the same combined movement of the bending ring, if necessary. Thus, according to this embodiment, the device according to the invention comprises at least two position stops capable of halting the travel of the sheet that is to be pressed in the longitudinal direction and in the lateral direction, it being possible for the intermediate support to rise and support the sheet that is to be pressed until the sheet breaks contact with the rollers, then it effects a travel in the longitudinal direction and a travel in the lateral direction until the sheet touches the at least two position stops.

When the intermediate support bearing the sheet of glass that is to be pressed effects a longitudinal travel and a lateral travel, these two travels can be not simultaneous, but they are preferably at least partially simultaneous and even totally simultaneous.

The picking-up of the sheet that is to be pressed by the intermediate support until the sheet that is to be pressed breaks contact with the rollers in order then to effect a travel in the longitudinal direction and possibly in the lateral direction in order to place it in the optimal position, corresponds to an improved and preferred mode of embodiment of the invention. However, this movement in the longitudinal direction and possibly in the lateral direction imparted to the sheet by the intermediate support is not indispensible for satisfactory performance of the invention. The device whereby the intermediate support moves only vertically is thus simpler.

When the sheet of glass is supported by the intermediate support and has broken any contact with the final rollers, and the sheet of glass that is to be pressed is in the optimal position, if appropriate in contact with at least one position stop, the pressing means comes into play to press the sheet firmly against the upper bending die. In particular, a bending die may rise, pick up the sheet of glass which has then generally broken any contact with the intermediate support, and the bending ring continues to meet the upper bending die in order to press the sheet against this die and therefore bend it into its desired final shape.

After the pressing that has given the sheet its final shape, the sheet needs to be cooled in order for it to maintain its bent shape. There are various possible systems that can recover the sheet and take it to a cooling zone. The sheet may simply be left to drop back onto the bed of rollers, which then carries the bent sheet away toward the cooling zone. It is preferable to use a cooling ring that recovers the bent sheet under the upper bending die. By way of example, the following procedure may be followed: after pressing, the upper bending die holds the sheet against it using a pneumatic force such as suction applied through orifices at its surface for contact with the sheet, allowing a bending ring that has performed a pressing operation to be lowered back down without taking the sheet with it. A cooling ring is then brought under the upper bending die, then the upward pneumatic force is halted and the bent sheet of glass then drops onto the cooling ring. If appropriate, a small amount of blowing may even be applied by the upper bending die through orifices in its contact face in order to assist with detaching the sheet of glass from the upper bending die. The cooling ring advantageously has the desired final shape for the sheet. The cooling ring then moves to take the bent sheet of glass to the cooling zone. If appropriate, a toughening or thermal tempering may be applied to the sheet by blowing cooling air.

The upper bending die may be a ring or a full-surface die. A full-surface die means one that comes into contact with the glass not only at its periphery but also over the entirety of the surface of the glass and in particular the central region thereof. A full-surface die may nevertheless have orifices at its surface, as illustrated in FIGS. 2 and 5 of WO2011/144865, it being possible for these orifices to be large in size, in particular formed by the intersecting of sheets or plates running perpendicular to the bending surface (see FIG. 5 of WO2011/144865). The orifices at the surface for contact with the glass may be used to apply suction or blowing. Suction is in particular applied when the sheet of glass that has just been bent needs to be held by the upper bending die when there is no bending tool supporting it via its underside. Blowing may potentially be applied via the same orifices when there is a desire to detach the sheet from the upper die, in particular when it is to be placed on a cooling ring.

After the sheet has been pressed, it may be kept in contact with the upper bending die by suction applied through its orifices in its contact face in contact with the glass, or using a skirt, when the sheet is no longer in contact with any bending tool via its underside (intermediate support or bending ring), and a cooling ring may be positioned under the sheet still in contact with the upper bending die. The suction is then halted and the sheet is collected by the cooling ring, then the cooling ring carries the bent sheet into a cooling zone, then the sheet is cooled.

The present invention relates to any type of glass, clear or tinted, coated with at least one layer, enameled or not enameled. The treated sheet according to the invention may be used for any application in the automotive or agricultural field (motor car, trucks, bus, etc.) to act as a windshield, rear screen, side window, quarter light, sunroof, bayflush or the like. The treated sheet according to the invention may also be used in any field outside of the automotive field, such as building, solar, specialty applications, aeronautics, vitreous ceramic hobs, etc. The treated sheet according to the invention may have any thickness (generally comprised in the range from 1 to 100 mm) and may be of any size, with no limit on the thickness or on the dimensions of the main faces. The treated sheet according to the invention may be tempered. It may be incorporated into laminated glazing. It may be ceramicized by a subsequent heat treatment if it is of the vitreous ceramic precursor type.

Figure 1:
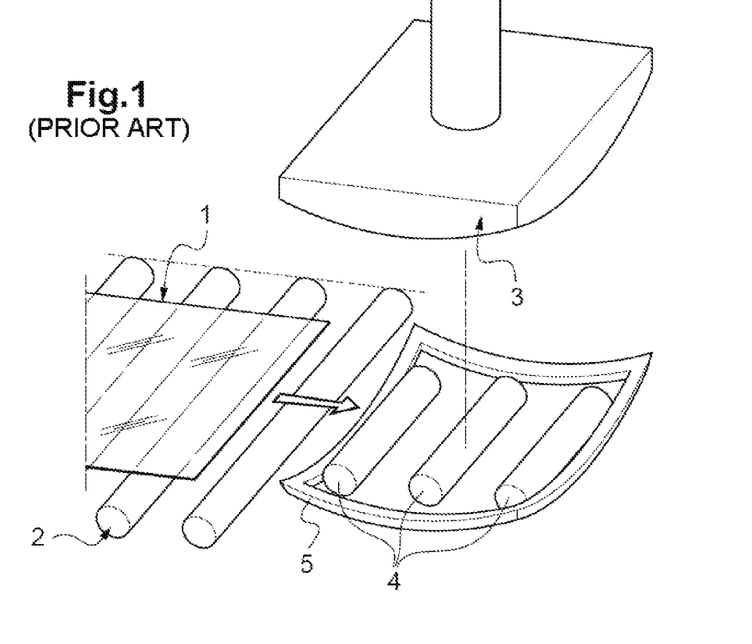

FIG. 1 depicts a device according to the prior art. A flat sheet of glass 1 is conveyed on a bed of rollers 2 in the longitudinal direction (indicated by an arrow) to bring it under an upper bending die 3, said die being a convex full-surface die. The flat sheet of glass has just left a furnace that has raised it to its deformation temperature. At the end of the longitudinal travel, the sheet is on the three final rollers 4. These final rollers 4 are not as long as the conveying rollers preceding them. Specifically, when viewed from above, these final rollers are circumscribed by the bending ring 5, which lies under the horizontal conveying plane as long as the sheet has not yet come under the upper bending die 3. When the sheet is in an optimal position under the upper bending die, then the bending ring 5 rises to pick up the sheet and press it against the upper bending die. The upper die 3 can also move downward to come to meet the sheet that is to be pressed.

Figure 2:
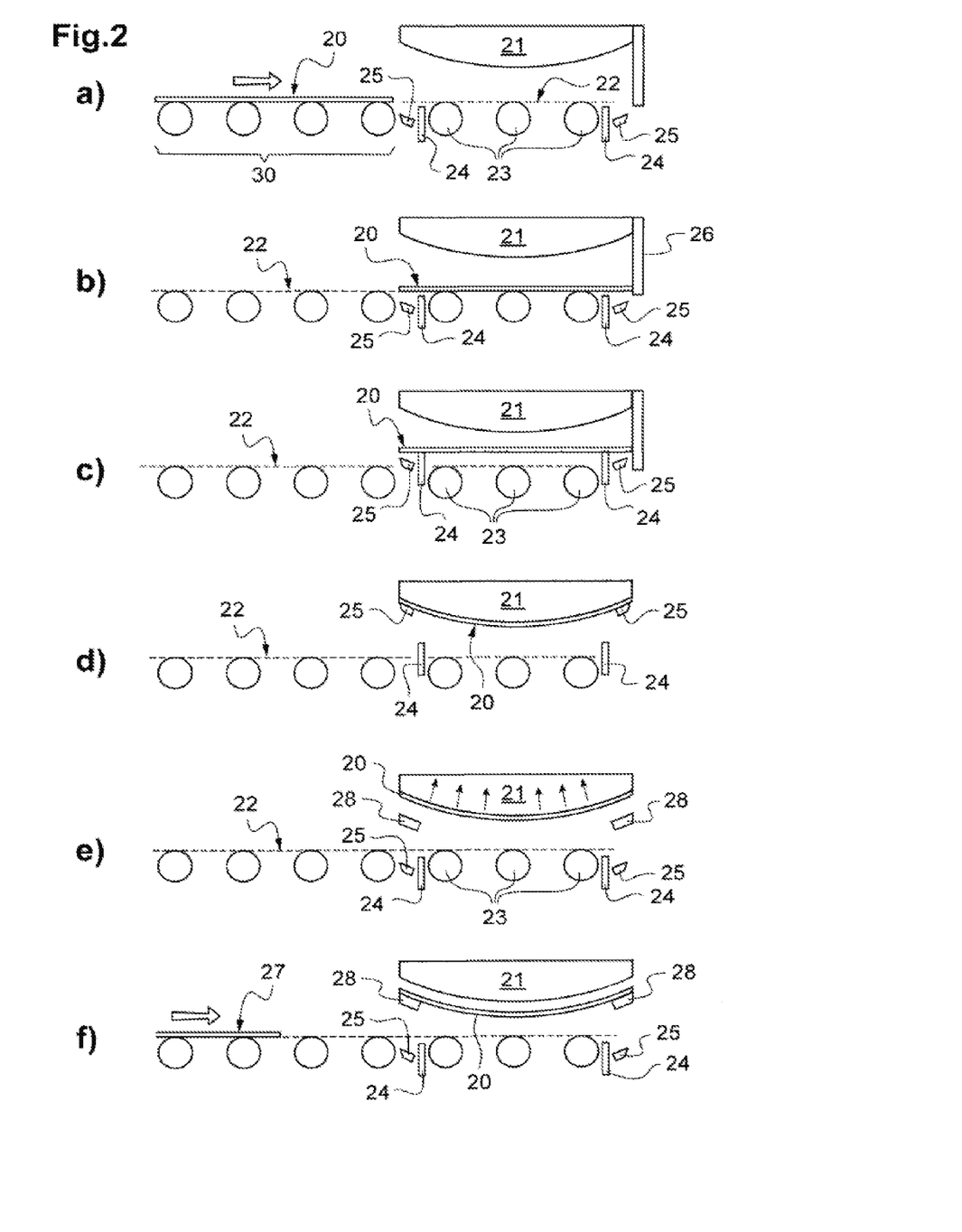

FIG. 2 depicts the device according to the invention viewed from the side at various stages in the process of bending a sheet of glass 20. In a), the sheet of glass 20 is conveyed by a bed of rollers 30 in the longitudinal direction (arrow) toward a position under the bending die 21. It has just left a furnace that has raised it to its deformation temperature. The sheet will be received on the flat and horizontal receiving surface 22 formed by the top of the final rollers 23. At this stage, the intermediate support 24 and the bending ring 25 are below the receiving surface 22, leaving the way clear for the sheet of glass to position itself under the upper bending die. In b), the sheet has just touched the position stop 26 halting the travel of the sheet in the longitudinal direction and giving it its optimal position under the upper bending die 21. In c), the intermediate support 24 has effected an upward vertical movement to pick up the periphery of the sheet of glass 20, which no longer touches the final rollers 23. In d), the bending ring 25 has moved vertically upward to pick up the periphery of the sheet of glass, relieving the intermediate support 24 of it, and has then pressed the sheet of glass 20 against the upper bending die 21. At this stage, the stop 26 is no longer needed and has been retracted and is no longer depicted. In e), the upper bending die 21 is applying suction through orifices to its bending face so as to hold the bent sheet of glass against it despite the lowering of the bending ring 25. A cooling ring 28 has positioned itself under the sheet of glass still held firmly against the upper bending die. The intermediate support 24 and the bending ring 25 are lowered back down beneath the receiving surface 22 for the sheets of glass. In f), the suction applied by the upper bending die has ceased and the bent sheet 20 has dropped onto the cooling ring 28. The sheet 20 can then be taken away toward a cooling zone. A new flat sheet of glass 27 is approaching, so as to undergo the same bending treatment as the sheet 20.

Figure 3:
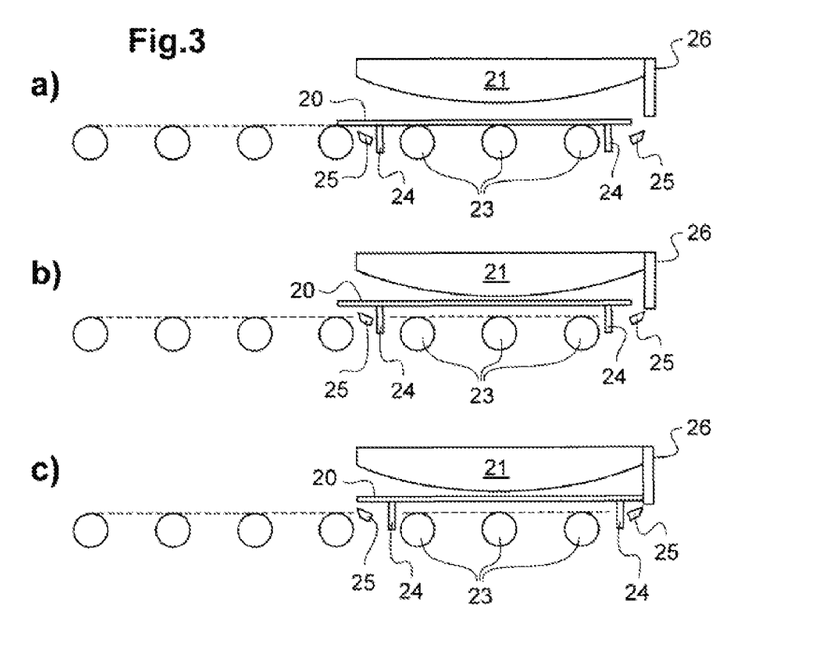

FIG. 3 depicts the device according to the invention in the alternative form whereby it is the intermediate support that brings the sheet of glass into contact with the position stop through a movement in the longitudinal direction. In a), the sheet of glass 20 has stopped under the upper bending die 21 before touching the stop 26, this having been achieved by halting the rotation of the final driven rollers 23. In b), the flat intermediate support has effected an upward vertical movement and picked up the sheet of glass which no longer touches the rollers. At this stage, the sheet is not yet in the optimal position under the bending die because the intermediate support has not yet moved in the longitudinal direction to the right. In c), the intermediate support 24 has moved to the right until the sheet of glass 20 comes into contact with the position stop 26. The sheet of glass is then in the optimal position under the upper bending die 21. The remainder of the method is then that of FIG. 2 from d) to f), the bending ring 25 picking up the sheet of glass to press it against the upper bending die 21.

Figure 4:
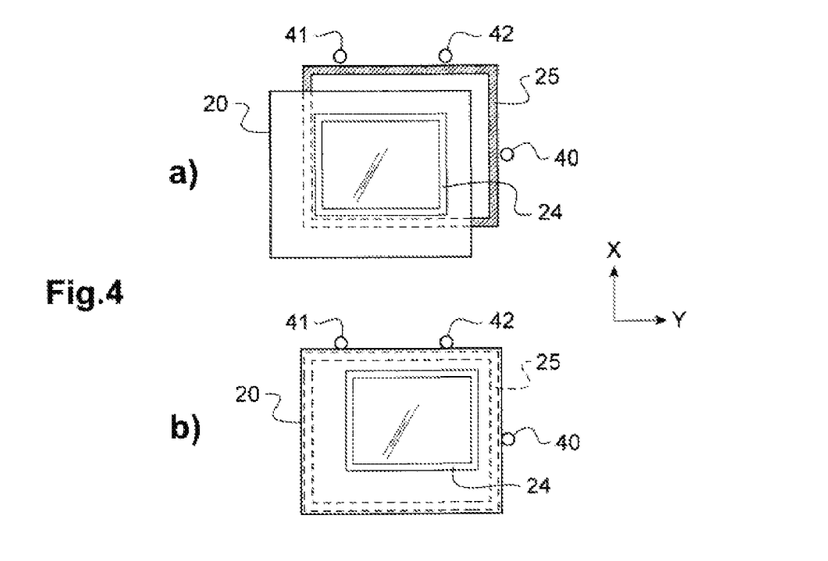

FIG. 4 depicts the device according to the invention viewed from above in the alternative form whereby the flat intermediate support 24 brings the sheet of glass 20 into contact with two position stops 41 and 42 through a movement in the longitudinal direction (X), and into contact with a position stop 40 through a movement in the lateral direction (Y). These movements in X-Y are preferably simultaneous and not one after the other. In a), the intermediate support is offset relative to the bending ring 25. It picks up the sheet of glass 20. It then moves in directions X and Y until the sheet touches the position stops 41, 42 and 40, which is what is depicted in b). The sheet is then in the optimal position under the upper bending die and the bending ring can rise to pick it up and press it against the upper bending die.

Figure 5:
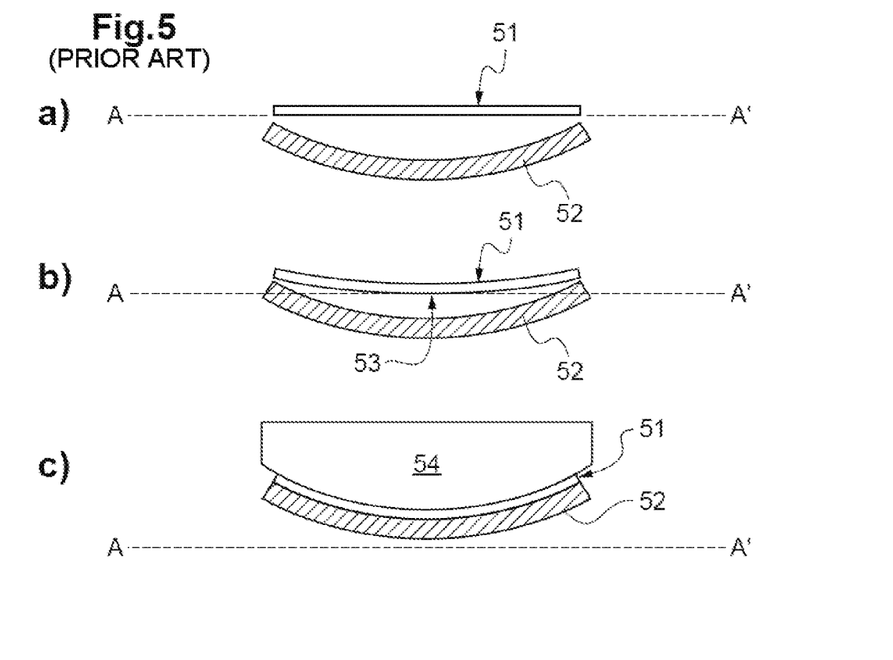

FIG. 5 depicts the device according to the prior art, in side view. In FIG. 5a), the flat sheet of glass 51 has come into position under the upper bending die (which is not depicted). It has stopped and is on the flat and horizontal receiving surface AA' depicted in dotted line, said dotted line depicting the virtual surface consisting of the top of the conveying rollers (which are not depicted). A press ring 52 is below the receiving surface for the sheet and ready to rise to pick it up. In FIG. 5b), the press ring 52 has begun to rise to pick up the sheet of glass 51. The press ring does not touch the sheet except at its uppermost points, which means that the center 53 of the sheet is still touching the rollers symbolized by the flat receiving surface AA'. In FIG. 5c), the press ring 52 and the upper bending die 54 have come together to press the sheet 51 between them.

Figure 6:
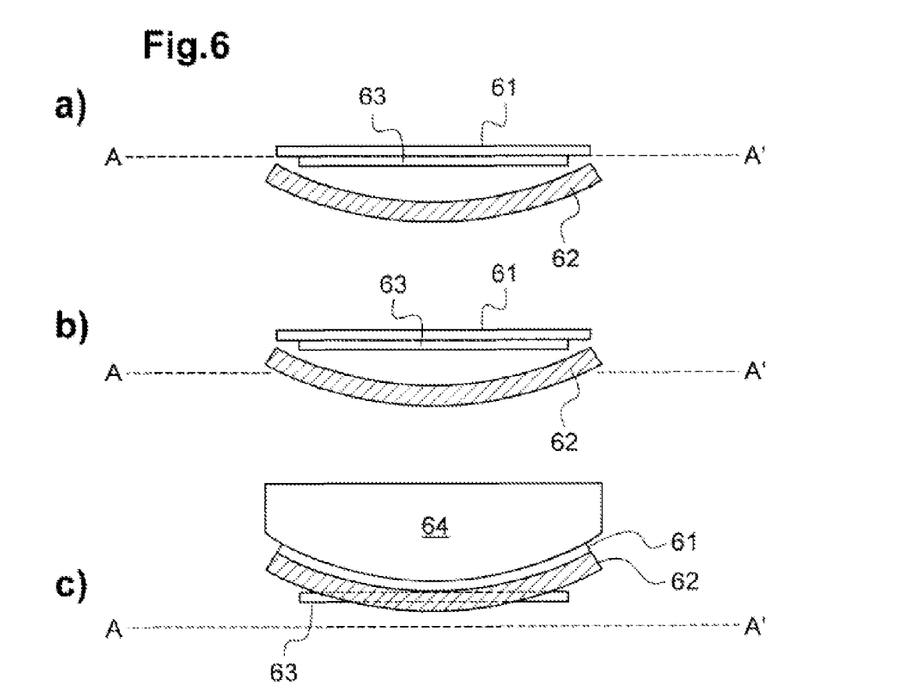

FIG. 6 depicts the device according to the invention in side view, for comparison with FIG. 5 that depicts the prior art. In FIG. 6a), the flat sheet of glass 61 has come into position under the upper bending die (which has not been depicted). It has stopped and lies on the flat receiving surface AA'. The press ring 62 and the intermediate support 63 are both below the receiving surface for the sheet and ready to rise to pick it up. In FIG. 6b), the intermediate support 63 has risen to pick up the sheet of glass 61 which immediately breaks contact with the rollers, in particular in the central region thereof, because it is kept near flat thanks to the flatness of the intermediate support 63. The press ring 62 is also raised, and at the same time as the raising of the intermediate support, but is not yet touching the glass. In FIG. 6c), the press ring 62 and the upper bending die 64 have come together to press the sheet 61 between them. The intermediate support 63 is depicted as still being in contact with the sheet of glass, but it is also possible for that no longer to be the case, it being possible for the intermediate support to lie in a lower-down position.

Figure 7:
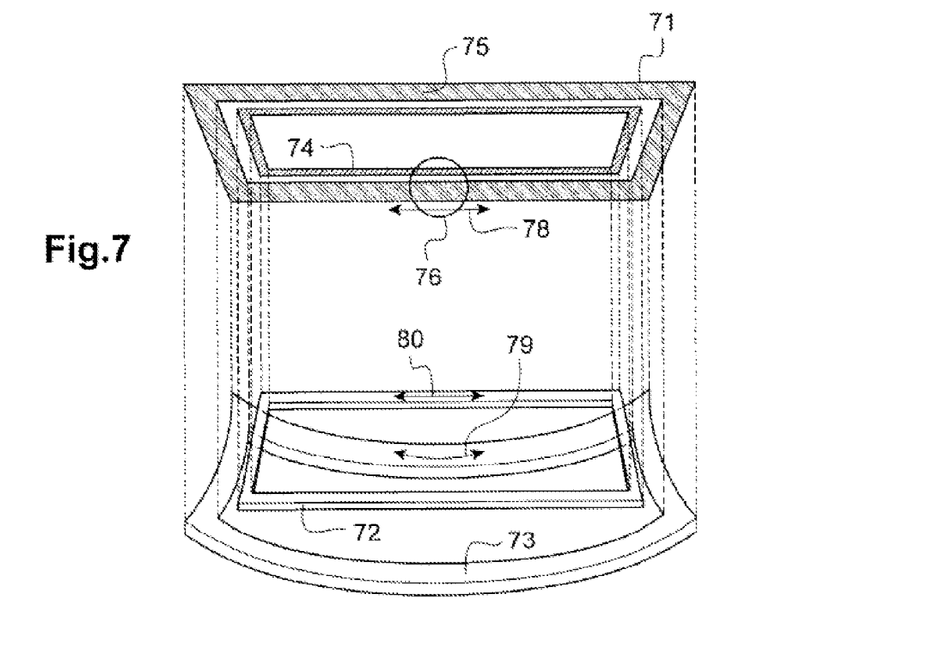

FIG. 7 depicts the main underside of a flat sheet of glass 71 intended to come into contact according to the invention with the intermediate support 72 and the bending ring 73. The zone of contact of the glass with the intermediate support is the zone 74. The zone of contact of the glass with the bending ring is the zone 75. If we consider the region 76 of the glass that is supported in the middle of one side of the sheet of glass, said region covering the zone 74 coming into contact with the intermediate support and the zone 75 coming into contact with the bending ring, then for this region 76 and in a direction 78 parallel (when viewed from above) to the edge of the sheet that is to be pressed, the curvature 79 of the contact path of the bending ring 73 is greater than the curvature 80 of the contact path of the intermediate support 72, the latter curvature incidentally being zero (infinite radius of curvature) because the intermediate support 72 here is flat. These curvatures are compared in the plane of their interaction with the sheet and are therefore compared in side view.

The invention claimed is:

1. A device for bending sheets of glass, comprising:
   conveying rollers that are configured to convey the sheets of glass one after another in a longitudinal direction, carrying them one after another under an upper bending die and onto a receiving surface formed by an upper level of the conveying rollers under the upper bending die;
   an intermediate support comprising a contact path for supporting a sheet of glass that is to be pressed lying under the upper bending die, said contact path having, parallel to an edge of the sheet of glass that is to be pressed, no curvature or a curvature that is less accentuated than the curvature that is to be imparted by the upper die, said intermediate support being able to rise above the receiving surface and support the sheet of glass that is to be pressed until the sheet of glass breaks contact with the conveying rollers, said intermediate support being able to be lowered down below the receiving surface, a sheet-pressing system being able to press the periphery of the sheet of glass against the upper bending die, and a bending ring comprising a contact path for supporting the sheet of glass that is to be pressed, said contact path of the bending ring having a curvature that is more accentuated than the curvature of the intermediate support in a direction parallel to the edge of the sheet of glass, said intermediate support and said bending ring being able to move vertically one inside the other, said bending ring being able to rise and come into contact with the periphery of the sheet of glass that is to be pressed.

2. The device as claimed in claim 1, wherein the intermediate support comes into contact with the sheet of glass that is to be pressed at a contact zone, said contact zone being wholly at the periphery of the sheet of glass, between the edge and 15 cm from the edge of the sheet of glass.

3. The device as claimed in claim 2, wherein said contact zone is between the edge and 7 cm from the edge of the sheet of glass.

4. The device as claimed in claim 3, wherein said contact zone is between the edge and 3 cm from the edge of the sheet of glass.

5. The device as claimed in claim 2, wherein the the contact path of the bending ring has a shape that complements that of the upper bending die, the bending ring being able to rise above the receiving surface and pick up the sheet of glass that is to be pressed by contacting it exclusively at its periphery and being able to press it against the upper bending die, said intermediate support and said bending ring being able to move vertically one inside the other, when viewed from above, the intermediate support being on the inside of the bending ring, the bending ring being able to be lowered below the receiving surface.

6. The device as claimed in claim 1, wherein the sheet-pressing system comprises the bending ring the contact path of which has a shape that complements that of the upper bending die, the bending ring being able to press the sheet of glass that is to be pressed against the upper bending die.

7. The device as claimed in claim 6, wherein, when viewed from above, the intermediate support is on the inside of the bending ring.

8. The device as claimed in claim 1, wherein the bending ring is configured to rise above the receiving surface in order to pick up the sheet of glass that is to be pressed, and is configured to be lowered down below the receiving surface.

9. The device as claimed in claim 1, wherein the intermediate support is configured to rise above the receiving surface and support the sheet of glass that is to be pressed until the sheet of glass breaks contact with the conveying rollers, then effect a travel in the longitudinal direction in order to place the sheet of glass that is to be pressed in an optimal position under the upper bending die.

10. The device as claimed in claim 9, wherein the intermediate support is configured to rise above the receiving surface and support the sheet of glass that is to be pressed until the sheet of glass breaks contact with the conveying rollers, then effect a travel in the longitudinal direction and a travel in the lateral direction in order to place the sheet of glass that is to be pressed in the optimal position under the upper bending die.

11. The device as claimed in claim 10, wherein the travel in the longitudinal direction and the travel in the lateral direction take place at least partially simultaneously.

12. The device as claimed in claim 1, wherein an optimal position of the sheet of glass that is to be pressed under the upper bending die is determined by contact of the edge face of the sheet of glass that is to be pressed against at least one stop that halts the travel of the sheet of glass that is to be pressed in the longitudinal direction.

13. The device as claimed in claim 1, further comprising a pneumatic system configured to allow the bent sheet of glass to be held against the upper bending die.

14. The device as claimed in claim 13, wherein the pneumatic system is a suction system with which the upper bending die is equipped, said upper bending die comprising orifices positioned on its face that contacts the sheet of glass that is to be pressed, or comprising a skirt surrounding same.

15. The device as claimed in claim 1, wherein the contact path of the intermediate support has a width of between 5 and 20 mm.

16. A method for bending sheets of glass using the device of claim 1, comprising bringing the sheet of glass that is to be pressed by the conveying rollers on the receiving surface under the upper bending die, then rising the intermediate support above the receiving surface so that the intermediate support comes to support the sheet of glass that is to be pressed until the sheet of glass breaks contact with the conveying rollers, then pressing by the sheet-pressing system the sheet of glass against the upper bending die.

17. The method as claimed in claim 16, wherein the the contact path of the bending ring has a shape that complements that of the upper bending die, and wherein after the intermediate support has supported the sheet of glass that is to be pressed, the bending ring presses the periphery of the sheet of glass that is to be pressed against the upper bending die.

18. The method as claimed in claim 17, wherein the intermediate support and the bending ring come into contact with the sheet of glass that is to be pressed exclusively at the periphery thereof, the intermediate support being, when viewed from above, on the inside of the bending ring, the bending ring lying below the receiving surface before it rises and returning back to below the receiving surface after pressing.

19. The method as claimed in claim 16, wherein the intermediate support supporting the sheet of glass that is to be pressed effects a travel in the longitudinal direction until the sheet of glass that is to be pressed is optimally positioned under the upper bending die.

20. The method as claimed in claim 19, wherein the intermediate support supporting the sheet of glass that is to be pressed effects a travel in the longitudinal direction and a travel in the lateral direction until the sheet of glass that is to be pressed is optimally positioned under the upper bending die.

21. The method as claimed in claim 16, wherein an optimal position of the sheet of glass that is to be pressed under the upper bending die is determined by contact of the edge face of the sheet of glass that is to be pressed against at least one position stop that halts its travel in the longitudinal direction.

22. The method as claimed in claim 16, wherein the sheet of glass that is to be pressed bears a layer of enamel and wherein the intermediate support comes into contact with the sheet of glass that is to be pressed in a zone that is rendered opaque by the enamel.

23. The method as claimed in claim 22, wherein the intermediate support rises and comes to support the sheet of glass that is to be pressed when the conveying rollers have not yet stopped.

24. The method as claimed in claim 16, wherein the device comprises a pneumatic system able to apply a pneumatic force that holds the bent sheet of glass against the upper bending die, said pneumatic system holding the bent sheet of glass against the upper bending die after the sheet of glass has been pressed, then a cooling ring is positioned under the sheet of glass still in contact with the upper bending die, then the pneumatic force holding the bent sheet of glass against the upper bending die is halted, then the sheet of glass is collected by the cooling ring, then the cooling ring takes the bent sheet of glass into a cooling zone.

25. A device for bending sheets of glass, comprising:
conveying rollers that are configured to convey the sheets of glass one after another in a longitudinal direction, carrying them one after another under an upper bending die and onto a receiving surface formed by an upper level of the conveying rollers under the upper bending die;
an intermediate support comprising a contact path for supporting a sheet of glass that is to be pressed lying under the upper bending die, said contact path having, parallel to an edge of the sheet of glass that is to be pressed, no curvature or a curvature that is less accentuated than the curvature that is to be imparted by the upper die, said intermediate support being able to rise above the receiving surface and support the sheet of glass that is to be pressed until the sheet of glass breaks contact with the conveying rollers, said intermediate support being able to be lowered down below the receiving surface, a sheet-pressing system distinct from the intermediate support being able to press the periphery of the sheet of glass against the upper bending die, wherein the intermediate support comes into contact with the sheet of glass that is to be pressed at a contact zone, said contact zone being wholly at the periphery of the sheet of glass, between the edge and 15 cm from the edge of the sheet of glass.

26. The device as claimed in claim 25, wherein the sheet-pressing system comprises a bending ring the contact path of which has a shape that complements that of the upper bending die, the bending ring being able to rise above the receiving surface and pick up the sheet of glass that is to be pressed by contacting it exclusively at its periphery and being able to press it against the upper bending die, said intermediate support and said bending ring being able to move vertically one inside the other, when viewed from above, the intermediate support being on the inside of the bending ring, the bending ring being able to be lowered below the receiving surface.

27. The device as claimed in claim 25, wherein the intermediate support is configured to rise above the receiving surface and support the sheet of glass that is to be pressed until the sheet of glass breaks contact with the conveying rollers, then effect a travel in the longitudinal direction in order to place the sheet of glass that is to be pressed in an optimal position under the upper bending die.

28. The device as claimed in claim 25, wherein an optimal position of the sheet of glass that is to be pressed under the upper bending die is determined by contact of the edge face of the sheet of glass that is to be pressed against at least one stop that halts the travel of the sheet of glass that is to be pressed in the longitudinal direction.

29. The device as claimed in claim 25, further comprising a pneumatic system configured to allow the bent sheet of glass to be held against the upper bending die, wherein the pneumatic system is a suction system with which the upper bending die is equipped, said upper bending die comprising orifices positioned on its face that contacts the sheet of glass that is to be pressed, or comprising a skirt surrounding same.

30. A method for bending sheets of glass using the device of claim 25, comprising bringing the sheet of glass that is to be pressed by the conveying rollers on the receiving surface under the upper bending die, then rising the intermediate support above the receiving surface so that the intermediate support comes to support the sheet of glass that is to be pressed until the sheet of glass breaks contact with the conveying rollers, then pressing by the pressing system the sheet of glass against the upper bending die.

31. The method as claimed in claim 30, wherein the intermediate support supporting the sheet of glass that is to be pressed effects a travel in the longitudinal direction until the sheet of glass that is to be pressed is optimally positioned under the upper bending die.

32. The method as claimed in claim 30, wherein the sheet of glass that is to be pressed bears a layer of enamel and wherein the intermediate support comes into contact with the sheet of glass that is to be pressed in a zone that is rendered opaque by the enamel.

33. The method as claimed in claim 30, wherein the intermediate support rises and comes to support the sheet of glass that is to be pressed when the conveying rollers have not yet stopped.

* * * * *